(12) United States Patent
Kato et al.

(10) Patent No.: US 10,897,604 B2
(45) Date of Patent: Jan. 19, 2021

(54) ABNORMALITY DETECTION UNIT, PROJECTOR, ABNORMALITY DETECTION METHOD, AND RECORDING MEDIUM

(71) Applicant: CASIO COMPUTER CO., LTD., Tokyo (JP)

(72) Inventors: Koichi Kato, Tachikawa (JP); Tomoya Makino, Mitaka (JP); Akira Inoue, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/224,355

(22) Filed: Dec. 18, 2018

(65) Prior Publication Data

US 2019/0215501 A1    Jul. 11, 2019

(30) Foreign Application Priority Data

Jan. 9, 2018  (JP) .................................. 2018-000928

(51) Int. Cl.
*H04N 9/31* (2006.01)

(52) U.S. Cl.
CPC ......... *H04N 9/3194* (2013.01); *H04N 9/3111* (2013.01); *H04N 9/3114* (2013.01); *H04N 9/3155* (2013.01); *H04N 9/3161* (2013.01)

(58) Field of Classification Search
CPC .. H04N 9/3194; H04N 9/3111; H04N 9/3114; H04N 9/3155; H04N 9/3161

USPC ........................................................... 353/85
See application file for complete search history.

(56) References Cited

U.S. PATENT DOCUMENTS

2016/0164256 A1\* 6/2016 Kuratomi ............ H01S 5/06825
                                                         353/85

FOREIGN PATENT DOCUMENTS

| JP | 2013-197807 | \* | 3/2012 | |
| JP | 2013-149417 | A | 8/2013 | |
| JP | 2013-197807 | A | 9/2013 | |
| JP | 2015-72480 | \* | 10/2014 | ............... H04N 9/31 |

OTHER PUBLICATIONS

Machine Translation of JP 2015-72480 (Year: 2019).\*
Machine Translation of JP 2013-197807 (Year: 2019).\*
JPO; Application No. 2018-000928; Notice of Reasons for Refusal dated Aug. 19, 2020.

\* cited by examiner

*Primary Examiner* — Jerry L Brooks
(74) *Attorney, Agent, or Firm* — Fitch, Even, Tabin & Flannery LLP

(57) ABSTRACT

An abnormality detection unit includes a light source device configured to emit light for each of segment periods that are time divided in a frame and an illuminance value obtaining unit configured to obtain an illuminance value of light emitted from the light source device and determines that the light source device is abnormal when all illuminance values obtained at the segment periods are less than a threshold.

10 Claims, 8 Drawing Sheets

ABNORMALITY DETECTION UNIT, PROJECTOR, ABNORMALITY DETECTION METHOD, AND RECORDING MEDIUM

CROSS-REFERENCE TO RELATED APPLICATION

This application is based upon and claims the benefit of priority under 35 USC 119 from Japanese Patent Application No. 2018-000928 filed on Jan. 9, 2018, the entire disclosure of which, including the description, claims, drawings and abstract, is incorporated herein by reference.

BACKGROUND

The present invention relates to an abnormality detection unit, a projector including the abnormality detection unit, an abnormality detection method, and a recording medium.

Data projectors are widely used on many occasions in these days as an image projection system for projecting a screen of a personal computer and video images, as well as images created based on image data recorded on a memory card or the like onto a screen. In these data projectors, light emitted from a light source converges on a micromirror display device called a Digital Micromirror Device (DMD) or a liquid crystal panel to display full color images on a separate screen.

There has been proposed a technique for stopping the drive of a light source in the event that something abnormal occurs in an interior of these projectors. For example, in a projector described in Japanese Patent Laid-Open No. 2013-197807, an output value of an illuminance sensor, which is set on a light source-side optical system in an interior of the projector, is obtained in synchronism with a timing signal of emitting light in the red wavelength range, a timing signal of emitting light in the green wavelength range, and a timing signal of emitting light in the blue wavelength range, and when the output value of the illuminance sensor does not fall within different threshold ranges that are set for the individual colors, determining that something abnormal has occurred in the interior of the projector, the driving of a light source unit is stopped.

SUMMARY

According to an aspect of the invention, there is provided an abnormality detection unit including a processor, an illuminance value obtaining unit, and a light source device, wherein the processor obtains an illuminance value of light emitted from the light source device configured to emit light to each of segment periods that are time divided within a frame from the illuminance value obtaining unit and detects that the light source device is in an abnormal state, when all the illuminance values obtained at the segment periods in the frame are less than a predetermined threshold.

According to another aspect of the invention, there is provided an abnormality detection method executed by an abnormality detection unit including a processor, an illuminance value obtaining unit, and a light source device, the abnormality detection method having: a light emitting step of emitting light for each of segment periods that are time divided within a frame from the light source device; an obtaining step of obtaining an illuminance value of light emitted for each of the segment periods by use of the illuminance value obtaining unit; and a detection step of detecting that the light source device is in an abnormal state, when all the illuminance values of the segment periods of the frame are less than a predetermined threshold.

According to a further aspect of the invention, there is provided a recording medium recording in it a program executable by an abnormality detection unit according to the invention which includes a processor, an illuminance value obtaining unit, and a light source device and readable by a computer, the program being configured to realize: an illuminance value obtaining function of obtaining an illuminance value of light emitted by the light source device for each of segment periods that are time divided within a frame by use of the illuminance value obtaining unit; and a detection function of detecting that the light source device is in an abnormal state, when all the illuminance values obtained at the segment periods are less than a predetermined threshold.

BRIEF DESCRIPTION OF THE DRAWINGS

This patent application will be understood more thoroughly by perusing a detailed description of the invention, which will be made below, together with accompanying drawings.

DETAILED DESCRIPTION

First Embodiment

Figure 1:
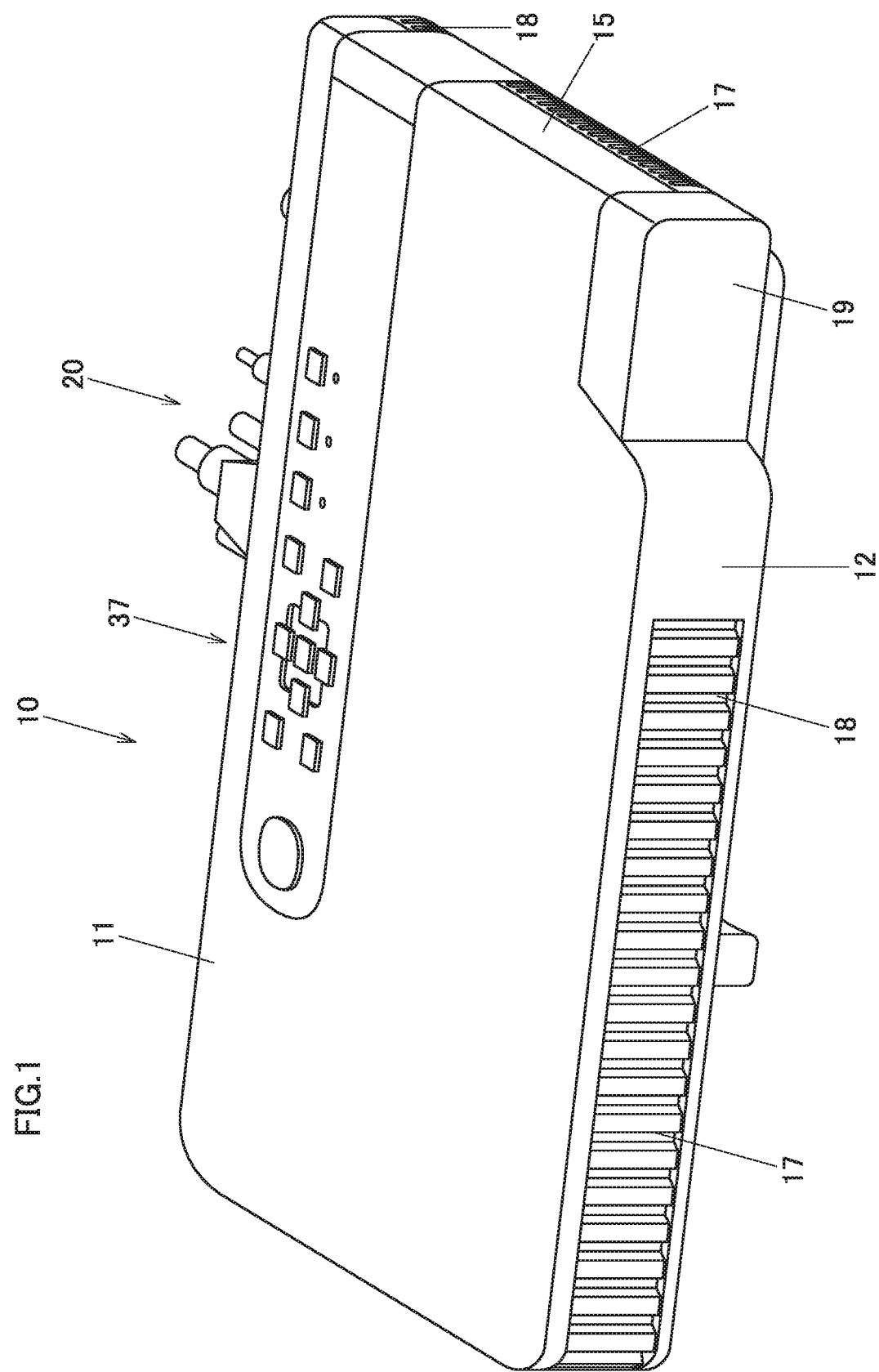
FIG. 1 is an external perspective view of a projector according to a first embodiment of the invention.

Hereinafter, a mode for carrying out the invention will be described. FIG. 1 is an external perspective view of a projector 10 according to a first embodiment of the invention. In the first embodiment, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

The projector 10 has a substantially rectangular parallelepiped shape as illustrated in FIG. 1. The projector 10 has a lens cover 19 that covers a projection port at a side of a front panel 12, which is a front side panel of a casing of the projector 10. Pluralities of outside air inlet holes 18 and inside air outlet holes 17 are provided in the front panel 12.

Further, although not illustrated, the projector 10 includes an Ir reception unit configured to receive a control signal from a remote controller.

A keys/indicators unit 37 is provided on an upper panel 11 of the casing. This keys/indicators unit 37 includes such keys and indicators as a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source unit, a display device, a control unit or the like when they really overheat.

Further, an input/output connector unit and various types of terminals 20 such as a power supply adaptor plug and the like are provided on a back panel of the casing, and a USB terminal, a video signal input D-SUB terminal, an S terminal, an RCA terminal and the like are provided in the input/output connector unit. Outside air inlet holes are formed in the back panel. Additionally, inside air outlet holes 17 are formed in each of a right panel, which is a side panel of the casing and is not illustrated in FIG. 1, and a left panel 15, which is also a side panel of the casing and is illustrated in FIG. 1. Further, outside air inlet holes 18 are formed in a corner portion between the left panel 15 and the back panel.

Figure 2:
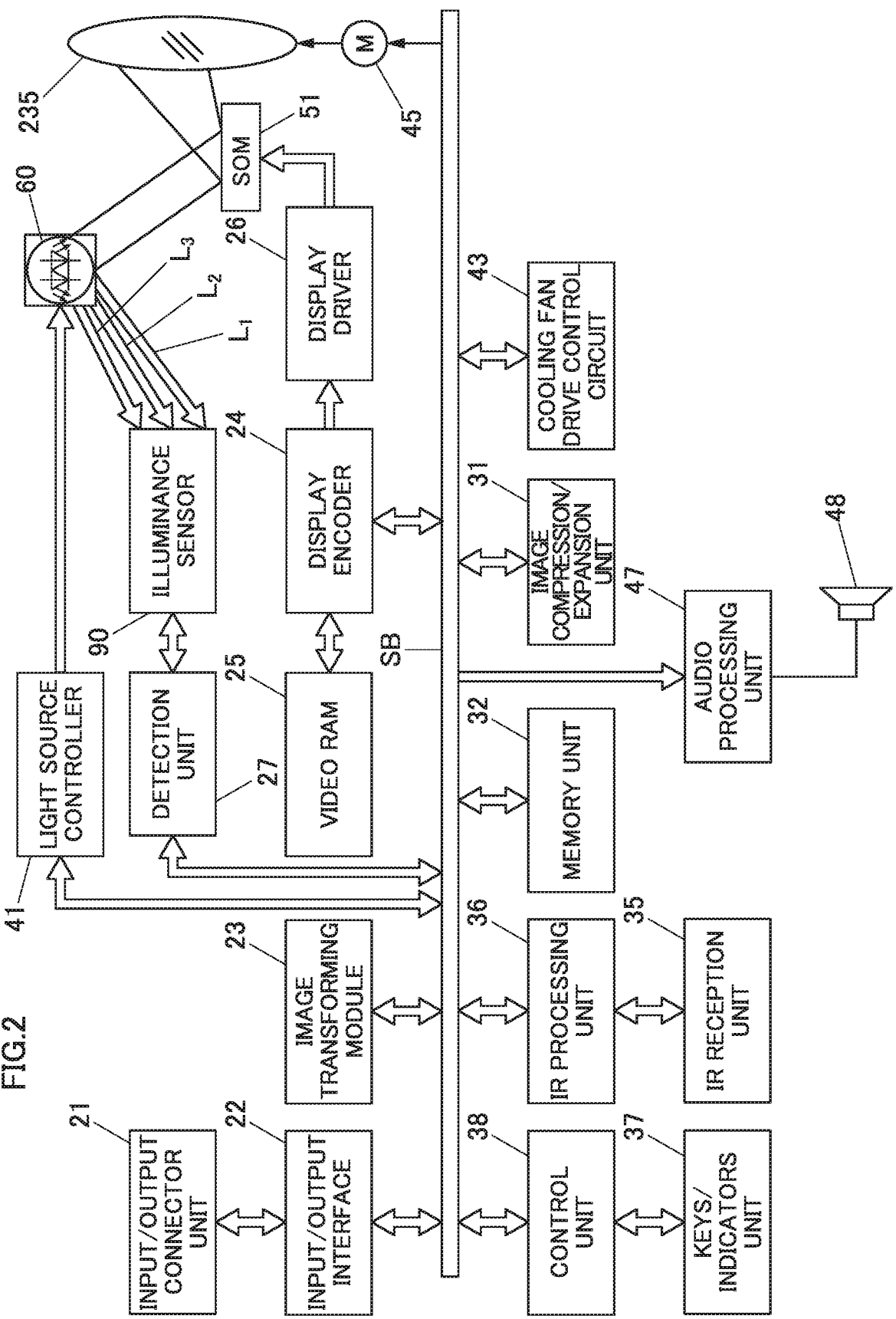
FIG. 2 is a block diagram illustrating functional blocks of the projector according to the first embodiment of the invention.

Next, the projector 10 will be described by the use of FIG. 2 illustrating functional blocks of the projector 10. The projector 10 includes a control unit 38, an input/output interface 22, an image transforming unit 23, a display encoder 24, a display driver 26 and the like. Image signals of various standards which are inputted from the input/output connector unit 21 are sent via the input/output interface 22 and a system bus (SB) to the image transforming unit 23 where the image signals are transformed so as to be unified into an image signal of a predetermined format which is suitable for display. Thereafter, the unified image signal is outputted to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 controls the driving of a display device. The display driver 26 drives a display device 51, which is a spatial optical modulator (SOM), at a frame rate corresponding to the image signal outputted from the display encoder 24. Then, in the projector 10, pencils of light emitted from a light source unit 60 are shone onto the display device 51 by way of a light guiding optical system. In addition, in the projector 10, an optical image is formed by reflecting the pencils of light shone onto the display device 51, and the image so formed is then projected onto a screen, not illustrated, for display by way of a projection-side optical system, which will be described later. A movable lens group 235 of the projection-side optical system is driven by a lens motor 45 for zooming and focusing.

An image compression/expansion unit 31 performs a recording process in which a luminance signal and a color difference signal of an image signal are data compressed through Adaptive Discrete Cosine Transform (ADCT) and Huffman coding processes, and the compressed data is sequentially written on a memory unit 32 which constitutes a detachable recording medium. With the projector 10 set in a reproducing mode, the image compression/expansion unit 31 reads out the image data recorded in the memory unit 32 and expands the individual image data that make up a series of dynamic images frame by frame. Then, the image compression/expansion unit 31 outputs the image data to the display encoder 24 by way of the image transforming unit 23 so as to enable the display of dynamic images based on the image data stored in the memory unit 32. In addition, the memory unit 32 can also store a program of determining on the abnormality of a light source unit 60 executed by the control unit 38 and a detection unit 27. Due to this, the light source unit 60 functions as an abnormality detection unit.

The control module 38 governs the control of respective operations of circuitries within the projector 10 and is made up of a processor, a ROM that stores operation programs of various types of settings in a fixed fashion, a RAM that is used as a working memory, and the like.

Operation signals generated at the keys/indicators unit 37 that includes the main keys and indicators which are provided on the upper panel 11 of the casing are sent out directly to the control unit 38. Key operation signals from the remote controller are received by the IR reception unit 35 and are then demodulated into a code signal at an IR processing unit 36 for output to the control unit 38.

The control unit 38 is connected to an audio processing unit 47 by way of the system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The control unit 38 controls a light source controller 41, which is configured as a light source control unit. The light source controller 41 controls the operation of an excitation light shining device 70 (refer to FIG. 3) separately so that the light source unit 60 can emit light in predetermined wavelength ranges which is necessary in generating an image. Additionally, when instructed by the control unit 38, the light source controller 41 controls a synchronizing timing of a luminescent material laid wheel 101 or the like according to a projection mode.

Further, the control unit 38 causes a cooling fan drive control circuit 43 to detect temperatures through a plurality of temperature sensors which are provided in the light source unit 60 so as to control the revolution speeds of cooling fans based on the results of the temperature detections. Additionally, the control unit 38 also causes the cooling fan drive control circuit 43 to keep the cooling fans rotating by use of a timer or the like even after the power supply to a main body of the projector 10 is switched off. Alternatively, the control unit 38 causes the cooling fan drive control circuit 43 to cut off the power supply to the main body of the projector 10 depending upon the results of the temperature detections by the temperature sensors.

The detection unit 27, which is a detection unit, detects light having a wavelength in the red wavelength range or simply light in the red wavelength range $L_1$, light having a wavelength in the green wavelength range or simply light in the green wavelength range $L_2$, and light having a wavelength in the blue wavelength range or simply light in the blue wavelength range $L_3$ which are emitted from the light source unit 60 to determine whether something abnormal occurs in the light source unit 60.

Figure 3:
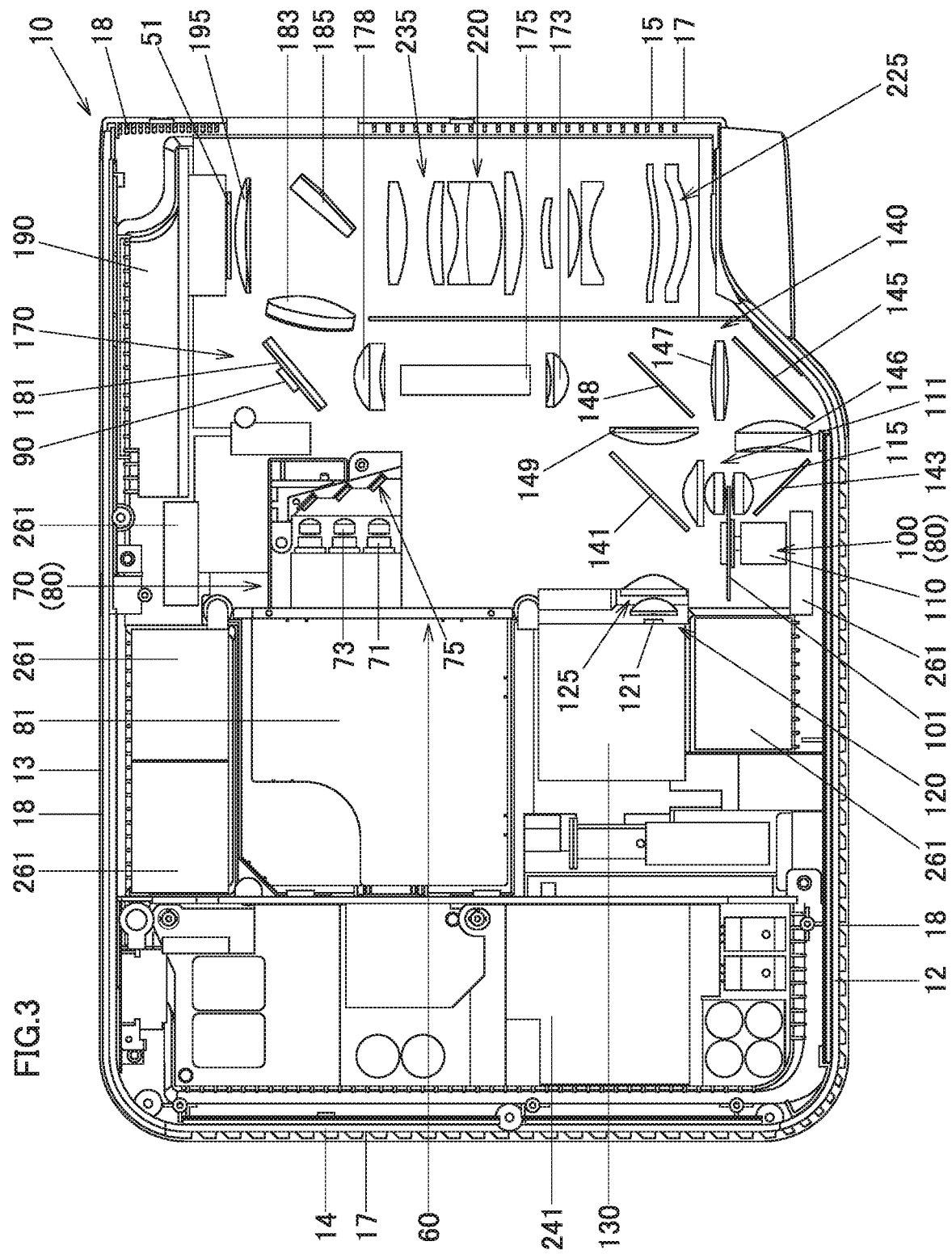
FIG. 3 is a schematic plan view illustrating an internal structure of the projector according to the first embodiment of the invention.

FIG. 3 is a schematic plan view illustrating an internal structure of the projector 10. The projector 10 includes a control circuit board 241 near a right panel 14. This control circuit board 241 includes a power supply circuit block and a light source control block. In addition, the projector 10 includes the light source unit 60 at a substantially central portion of the casing of the projector 10. Further, the projector 10 includes a light source-side optical system 170 and a projection-side optical system 220, which are disposed between the light source unit 60 and the left panel 15.

The light source unit 60 includes light source devices as light emitting devices such as the excitation light shining device 70, a green light source device 80, and a red light source device 120. The green light source device 80 is made up of the excitation light shining device 70 and a luminescent wheel device 100. The excitation light shining device 70 constitutes a blue light source device configured to emit light in the blue wavelength range. The luminescent wheel device 100 emits light in the green wavelength range. The red light source device 120 emits light in the red wavelength range. The light source unit 60 includes a light guiding optical system 140. This light guiding optical system 140 guides and emits light in the red, green and blue wavelength ranges. The light guiding optical system 140 guides light in the red wavelength range, light in the green wavelength range and light in the blue wavelength range which are emitted, respectively, from the excitation light shining device 70, the luminescent wheel device 100 and the red light source device 120 to the light source side optical system 170.

The excitation light shining device 70 is disposed in a position in the casing of the projector 10 which is situated substantially at a center in relation to a left-and-right direction and near the back panel 13. The excitation light shining device 70 includes a light source group which is made up of blue laser diodes 71 (excitation light sources), which are a plurality of semiconductor light emitting devices, disposed so that their optical axes become parallel to the back panel 13, a reflecting mirror group 75 configured to turn axes of light beams emitted from the blue laser diodes 71 through 90 degrees in the direction of the front panel 12, and a heat sink 81 disposed between the blue laser diodes 71 and the right panel 14.

The light source group is formed by arranging the plurality of blue laser diodes 71 into a matrix configuration. In this embodiment, when rows are understood to be aligned in an up-and-down direction in FIG. 3, and columns are understood to be aligned in a vertical direction to a surface of a sheet of paper on which FIG. 3 is drawn, when the excitation light shining device 70 is seen sideways from the left panel 15, a total of 6 blue laser diodes 71 is arranged into a matrix configuration of two rows and three columns.

A plurality of collimator lenses 73 are disposed individually on optical axes of the blue laser diodes 71. The collimator lenses 73 convert light emitted from the corresponding blue laser diodes 71 into parallel light so as to enhance the directivity of the emitted light. The reflecting mirror group 75 is formed by integrating a plurality of reflecting mirrors, which are arranged like steps in a staircase, with corresponding mirror bases. The reflecting mirror group 75 narrows pencils of light emitted from the blue laser diodes 71 in one direction to emit them towards a first dichroic mirror 141.

A cooling fan 261 is disposed between the head sink 81 and the back panel 13, so that the blue laser diodes 71 are cooled by the cooling fan 261 and the heat sink 81. Further, a cooling fan 261 is also disposed between the reflecting mirror group 75 and the back panel 13, so that the reflecting mirror group 75 is cooled by this cooling fan 261.

The luminescent wheel device 100 is disposed on an optical path of excitation light emitted from the excitation light shining device 70 and near the front panel 12. The luminescent wheel device 100 includes the luminescent material laid wheel 101, a motor 110, a collective lens group 111, and a collective lens 115.

The luminescent material laid wheel 101 is disposed so as to be substantially parallel to the front panel 12, that is, so as to be right angles to an axis of light emitted from the excitation light shining device 70. The motor 110 drives rotationally the luminescent material laid wheel 101. The collective lens group 111 collects excitation light emitted from the excitation light shining device 70 to the luminescent material laid wheel 101 and collects luminescent light emitted from the luminescent material laid wheel 101 in the direction of the back panel 13. The collective lens 115 collects luminescent light that the luminescent material laid wheel 101 emits in the direction of the front panel 12. A cooling fan 261 is disposed on a side of the motor 110 that faces the front panel 12, so that the luminescent material laid wheel 101 and the like are cooled by this cooling fan 261.

The luminescent material laid wheel 101 has a substantially circular disc shape. A center shaft of the luminescent material laid wheel 101 is fixed to a shaft section of the motor 110. A base material of the luminescent material laid wheel 101 is formed of metal such as copper, aluminum or the like. A surface of the base material that faces the excitation light shining device 70 constitutes a reflecting surface that is mirror finished through silver deposition or the like. A luminescent light emitting zone configured to emit light in the green wavelength range and a transmission zone configured to pass through light in the blue wavelength range are provided circumferentially in an end-to-end fashion near an outer circumferential edge of the luminescent material laid wheel 101 on a side thereof on which excitation light is incident.

A luminescent material layer of a green luminescent material is formed on the luminescent light emitting zone. The luminescent material layer is formed on the mirror finished reflecting surface of the luminescent body laid wheel 101. The transmission zone is formed into a semi arc shape. The transmission zone is formed, for example, by fitting a transparent base material having a light transmission property in a cut-out formed in an outer circumferential edge portion of the base material of the luminescent material laid wheel 101.

When light in the blue wavelength range emitted from the excitation light shining device 70 is shone onto the luminescent material layer, the luminescent material layer emits luminescent light which is light in the green wavelength range. When light in the blue wavelength range emitted from the excitation light shining device 70 is shone onto the transmission zone, the transmission zone diffuses the light and transmits the diffuse light from a front side towards a rear side of the luminescent material laid wheel 101.

The red light source device 120 includes a red light source 121 and a collective lens group 125. The red light source 121 is disposed so that an optical axis thereof becomes parallel to the blue laser diodes 71, and the collective lens group 125 is configured to collect light emitted from the red light source 121. The red light source 121 is a light emitting diode which is a semiconductor light emitting device that emits light in the red wavelength range. The red light source device 120 is disposed so that an axis of light in the red wavelength range that the red light source device 120 emits intersects an axis of light in the green wavelength range that the luminescent material laid wheel 101 emits. The red light source device 120 includes a heat sink 130 disposed on a side of the red light source 121 that faces the right panel 14. A cooling fan 261 is disposed between this heat sink 130 and the front panel 12, so that the red light source 121 is cooled by this cooling fan 261 and the heat sink 130.

The light guiding optical system 140 is made up of dichroic mirrors (a first dichroic mirror 141, a second dichroic mirror 148), reflecting mirrors (a first reflecting mirror 143, a second reflecting mirror 145), and collective lenses 146, 147, 149. The reflecting mirrors turn axes of pencils of light in the red, green and blue wavelength ranges to align them in the same light axis direction, and the collective lenses 146, 147, 149 collect pencils of light in the red, green and blue wavelength ranges. Hereinafter, these constituent elements of the light guiding optical system 140 will be described.

The first dichroic mirror 141 is disposed in a position lying between the reflecting mirror group 75 and the collective lens group 111. Light in the red wavelength range that the red light source 121 emits passes through the first dichroic mirror 141, and light in the green wavelength range that the luminescent material laid wheel 101 emits is reflected by the first dichroic mirror 141. Thus, the light in the red wavelength range and the light in the green wavelength range travel along the same optical path towards the collective lens 149.

The first reflecting mirror 143 is disposed on an axis of light in the blue wavelength range that passes through the luminescent material laid wheel 101 to be emitted therefrom, that is, between the collective lens 115 and the front panel 12.

The first reflecting mirror 143 reflects light in the blue wavelength range and guides it to the collective lens 146. The collective lens 146 is disposed on a side of the first dichroic mirror 143 that faces the left panel 15. The second reflecting mirror 145 is disposed on a side of the collective lens 146 that faces the left panel 15. The second reflecting mirror 146 turns an axis of the light in the blue wavelength range that is incident thereon from the collective lens 146 through 90 degrees towards the back panel 13.

The collective lens 147 is disposed on a side of the second reflecting mirror 145 that faces the back panel 13. The second dichroic mirror 148 is disposed on a side of the collective lens 149 that faces the left panel 15 and a side of the collective lens 147 that faces the back panel 13. The second dichroic mirror 148 reflects light in the green wavelength range and light in the red wavelength range and passes through light in the blue wavelength range.

Light in the blue wavelength range collected by the collective lens 147 passes through the second dichroic mirror 148 and is collected by a collective lens 173 of the light source-side optical system 170.

The collective lens 149 is disposed on a side of the first dichroic mirror 141 that faces the left panel 15. Light in the green wavelength range that is reflected by the first dichroic mirror 141 and light in the red wavelength range that passes through the first dichroic mirror 141 are guided to the collective lens 149. The light in the green wavelength range and the light in the red wavelength range that are incident on and collected by the collective lens 149 are reflected by the second dichroic mirror 148 and are collected by the collective lens 173 of the light source-side optical system 170. In this way, the light in the red wavelength range, the light in the green wavelength range and the light in the blue wavelength range are guided to the light source-side optical system 170.

The light source-side optical system 170 is made up of the collective lens 173, a light tunnel 175, a collective lens 178, a light axis turn mirror 181, a collective lens 183, a shining mirror 185, a condenser lens 195, and the like. Since the condenser lens 195 emits image light emitted from the display device 51 disposed on a side of the condenser lens 195 that faces the back panel 13 towards the projection-side optical system 220, the condenser lens 195 also makes up part of the projection-side optical system 220.

The collective lens 173 is disposed near an entrance port of the light tunnel 175 and collects light source light. The light in the red, green and blue wavelength ranges collected to the collective lens 173 is emitted towards the light tunnel 175.

The light axis turn mirror 181 is disposed on an optical axis of the light tunnel 175 that extends from the light tunnel 175 towards the back panel 13 in a position lying behind the collective lens 178. Pencils of light emerging from an exit port of the light tunnel 175 are collected by the collective lens 178 and are then turned by the light axis turn mirror 181 so that their axes are directed towards the left panel 15. An illuminance sensor 90, which constitutes an illuminance value obtaining device, is disposed on a rear surface of the light axis turn mirror 181. The illuminance sensor 90 is set in such a position that light leaking from or indirect light of the light guided to and reflected by the light axis turn mirror 181 is incident on the illuminance sensor 90. That is, the illuminance sensor 90 is disposed in such a position that can receive light in the red wavelength range, light in the green wavelength range and light in the blue wavelength range.

The pencils of light reflected on the light axis turn mirror 181 are collected by the collective lens 183 and are then shone on to the display device 51 at a predetermined angle by the shining mirror 185 by way of the condenser lens 195. In this embodiment, a DMD is used as the display device 51. The display device 51 is cooled by a heat sink 190 that is provided on a side thereof that faces the back panel 13.

The pencils of light, which are the light source light shone onto an image forming plane of the display device 51 by the light source-side optical system 170, are reflected on the image forming plane of the display device 51 to be projected on to a screen as projected light by way of the projection-side optical system 220. Here, the projection-side optical system 220 is made up of the condenser lens 195, the movable lens group 235, a fixed lens group 225, and the like. The movable lens group 235 can be moved by the lens motor. Then, the movable lens group 235 and the fixed lens group 225 are incorporated in a fixed lens barrel. Thus, the fixed lens barrel including the movable lens group 235 includes a variable-focus lens and can be controlled for zooming and focusing.

With the projector 10 that is configured as described heretofore, when the luminescent material laid wheel 101 is rotated, and light is emitted at appropriate timings from the excitation light shining device 70 and the red light source device 120, light in the red wavelength range, light in the green wavelength range and light in the blue wavelength range are incident on the display device 51 by way of the light guiding optical system 140 and the light source-side optical system 170. Due to this, the display device 51 of the projector 10, which is the DMD, displays the red, green and blue light in a time-dividing fashion, whereby a color image can be projected onto a screen.

Next, an abnormality detection method performed by the light source unit 60 will be described. Firstly, the summary of an abnormality determination resulting from a positional deviation or removal of an optical member of the light source unit 60 in this embodiment will be described. In this embodiment, as illustrated in FIG. 3, part of light having a wavelength in the red wavelength range or simply light in the red wavelength range, light having a wavelength range in the green wavelength range or simply light in the green wavelength range, and light having a wavelength in the blue wavelength range or simply light in the blue wavelength range that are emitted from the light source unit 60 is shone onto an illuminance sensor 90 set on an optical path (for example, on an optical path of the light source-side optical system 170 illustrated in FIG. 3). An illuminance detected by the illuminance sensor 90 is transferred to the detection unit 27 illustrated in FIG. 2 in the form of a digital value. The detection unit 27 determines based on the digital value whether or not the light source unit 60 is abnormal. As a result, when the detection unit 27 determines that the light source unit 60 is abnormal, the control unit 38 stops the light source unit 60 via the light source controller 41.

Figure 4:
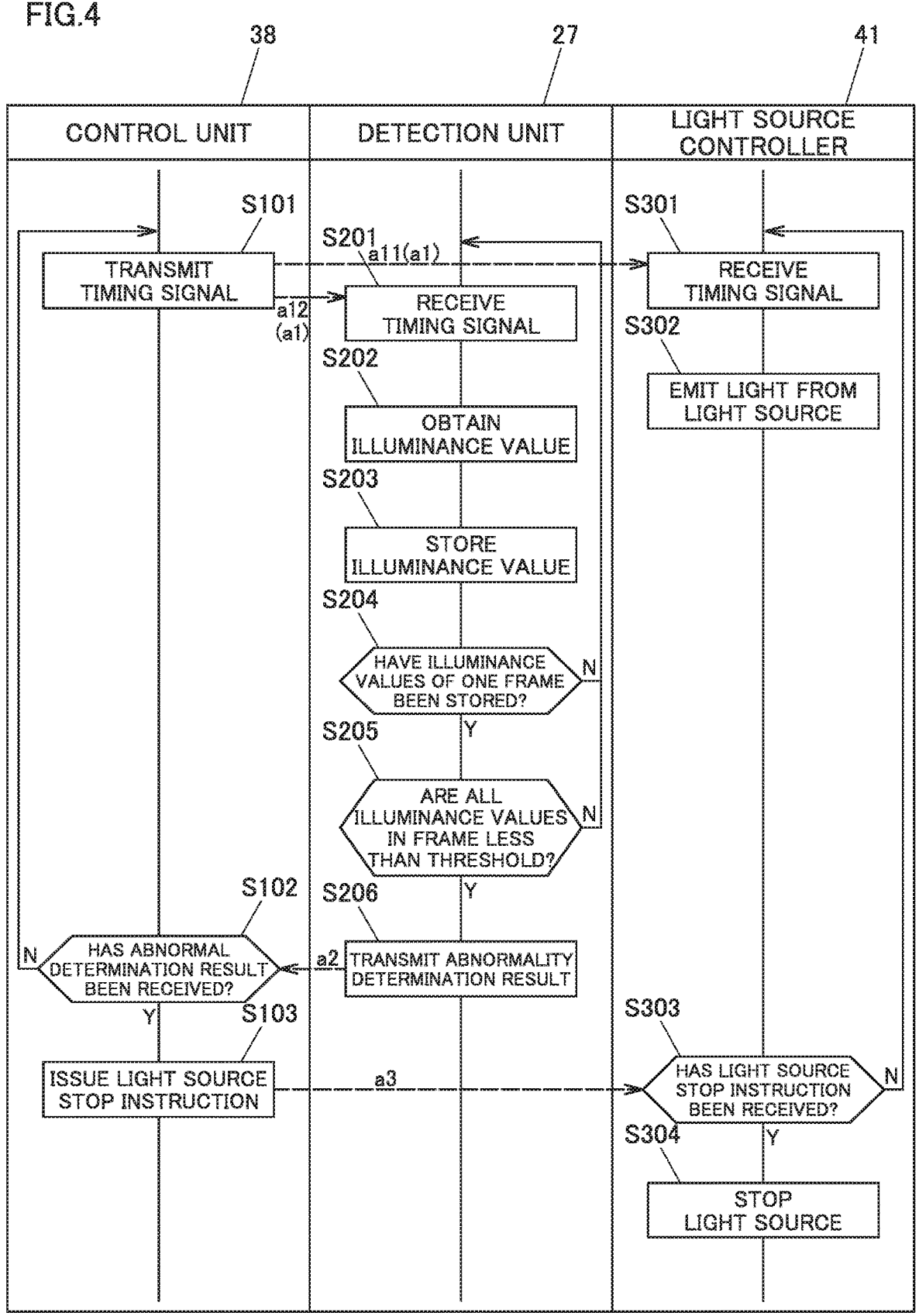
FIG. 4 is a flow chart illustrating a sequence of the projector according to the first embodiment of the invention.
Figure 5:
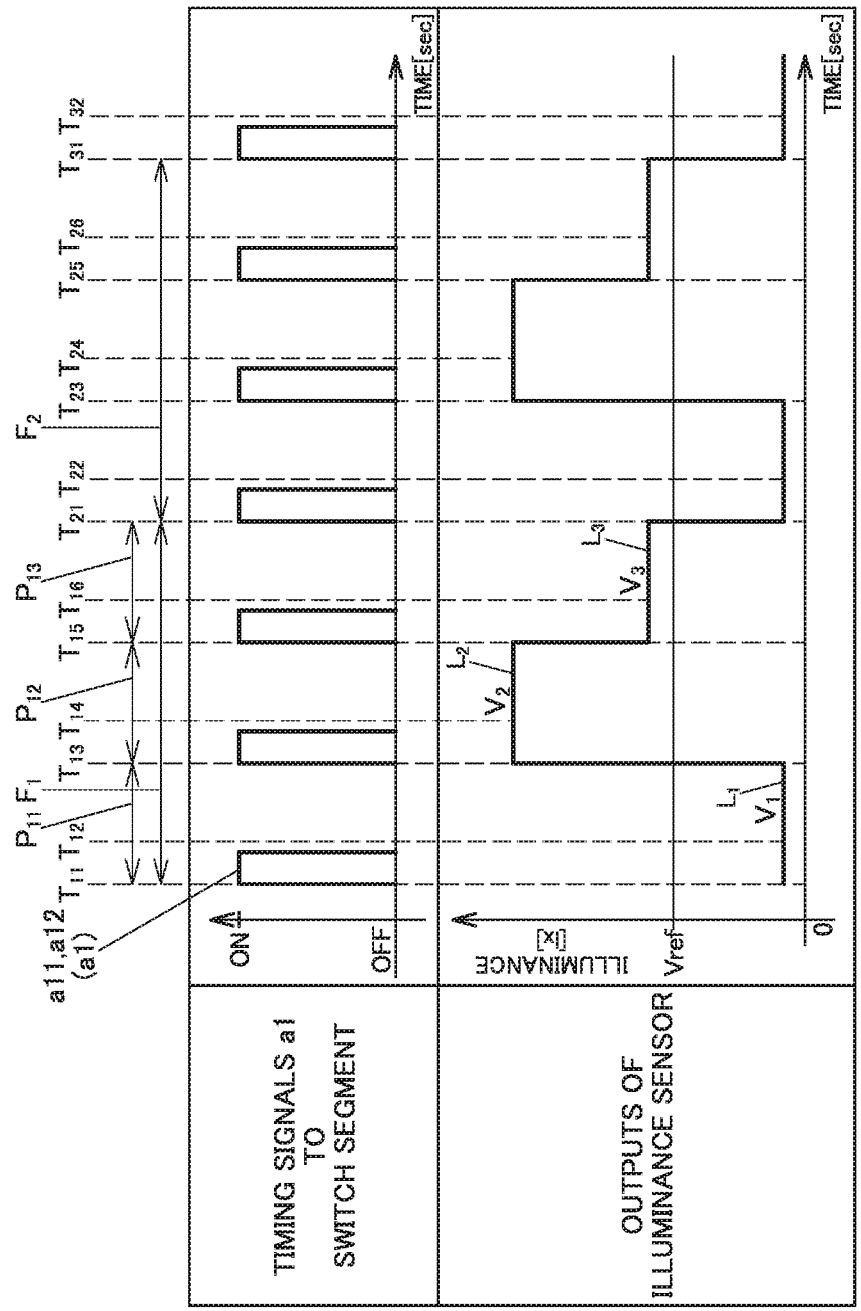
FIG. 5 is a flow chart illustrating timing signals of the projector according to the first embodiment of the invention and outputs of an illuminance sensor.

FIG. 4 is a flow chart illustrating a sequence of an abnormality determination process performed by the control unit 27. Additionally, FIG. 5 is a time chart of timing signals of the projector 10 and outputs of the illuminance sensor 90.

Firstly, in Step S101, the control unit 38 transmits timing signals a11, a12 (a1) to the detection unit 27 and the light source controller 41. The timing signal a1 is used to realize a time division generator and constitutes a trigger signal for switching light emitted by the light source unit 60 from light in the red wavelength range to light in the green wavelength range, light in the green wavelength range to light in the blue wavelength range, or light in the blue wavelength range to light in the red wavelength range. Due to this, the control unit 38 controls timings of emitting light in the red wavelength range $L_1$, light in the green wavelength range $L_2$ and light in the blue wavelength range $L_3$ using the timing signals a11, a12 (a1).

The illuminance sensor 90 can obtain illuminance values V1, V2, V3 in synchronism with a rise of this timing signal a1. Although which of the light in the red, green and blue wavelength ranges is to be emitted is not identified only by the timing signal a1 in this embodiment, the sequence of the wavelength ranges of light emitted by the light source unit 60 is determined in advance. For example, as shown in FIG. 5, the timing signal a1 is a pulse-shaped wave and is transmitted at a timing $T_{11}$ of an initial frame $F_1$.

In Step S301, when the light source controller 41 receives a segment switching timing signal a11 from the control unit 38 as a trigger, the light source controller 41 proceeds to a process in Step S302. In Step S302, the light source controller 41 instructs the light source unit 60 to be driven to emit any one of light in the red wavelength range, light in the green wavelength range and light in the blue wavelength range. For example, in FIG. 5, when receiving the timing signal a11 at the timing $T_{11}$, the light source controller 41 instructs the light source unit 60 to emit light in the red wavelength range $L_1$ from the red light source device 120 in FIG. 3. When receiving the timing signal a1 at a timing $T_{13}$, the light source controller 41 instructs the light source unit 60 to emit light in the green wavelength range $L_2$. When receiving the timing signal a1 at a timing $T_{15}$, the light source controller 41 instructs the light source unit 60 to emit light in the blue wavelength range $L_3$.

In Step S201, the detection unit 27 proceeds to a process in Step S202 when receiving the timing signal a12.

In Step S202, the detection unit 27 receives any one of light in the red wavelength range $L_1$, light in the green wavelength range $L_2$, and light in the blue wavelength range $L_3$ after a predetermined delay time elapses from the reception of the timing signal a12 and obtains any one of illuminance values $V_1$, $V_2$, and $V_3$. Timings $T_{12}$, $T_{14}$, $T_{16}$ shown in FIG. 5 are timings resulting when the delay time elapses from the corresponding timings $T_{11}$, $T_{13}$, $T_{15}$. In a segment period $P_{11}$ in FIG. 5 where the light source unit 60 emits light in the red wavelength range $L_1$, the detection unit 27 obtains an illuminance value $V_1$ of light in the red wavelength range $L_1$ at the timing $T_{12}$. In a segment period $P_{12}$, the detection unit 27 obtains an illuminance value $V_2$ of light in the green wavelength range $L_2$ at the timing T14 and obtains an illuminance value $V_3$ of light in the blue wavelength range $L_3$ at the timing $T_{16}$ in a segment period $P_{13}$.

In Step S203, the detection unit 27 performs an analog-digital (AD) conversion on the illuminance values obtained in Step S202 and stores the converted illuminance values in the form of a digital value in the memory unit 32.

In Step S204, the detection unit 27 determines whether the illuminance values of one frame or more are stored in the memory unit 32. When determining that the illuminance values of one frame or more are not stored in the memory unit 32 (S204, N), the detection unit 27 returns to the process in Step S201, whereas when determining that the illuminance values of one frame or more are stored in the memory unit 32 (S204, Y), the detection unit 27 proceeds to a process in Step S205.

When the illuminance values of one frame or more are not stored in the memory unit 32 (S204, N), the detection unit 27 receives the timing signal a12 again and repeats the processes in Steps S201 to S204, whereby the detection unit 27 obtains illuminance values $V_1$, $V_2$, $V_3$ of light in the red wavelength range $L_1$, light in the green wavelength range $L_2$, and light in the blue wavelength range $L_3$.

In Step S205, the detection unit 27 determines whether all the illuminance values $V_1$, $V_2$, $V_3$ of one frame are less than a threshold $V_{ref}$. When determining that all the illuminance values of the one frame are not less than the threshold $V_{ref}$ (S205, N), the detection unit 27 returns to the process in Step S201, whereas when determining that all the illuminance values of the one frame are less than the threshold $V_{ref}$ (S205, Y), the detection unit 27 proceeds to a process in Step S206. In the example of the frame $F_1$ in FIG. 5, since the illuminance value $V_1$ of light in the red wavelength range $L_1$ is less than the threshold $V_{ref}$, whereas the illuminance value $V_2$ of light in the green wavelength range $L_2$ and the illuminance value $V_3$ of light in the blue wavelength range $L_3$ are not less than the threshold $V_{ref}$ in the frame $F_1$, the detection unit 27 returns to the process in Step S201.

In Step S206, the detection unit 27 transmits an abnormality determination result a2 indicating that the light source is abnormal to the control unit 38.

In Step S102, the control unit 38 determines whether the control unit 38 has received the abnormality determination result a2 from the control unit 27. When determining that the control unit 38 has not received the abnormality determination result a2 (S102, N), the control unit 38 proceeds to the process in Step S101, whereas when determining that the control unit 38 has received the abnormality determination result a2 (S102, Y), the control unit 38 proceeds to a process in Step S103.

In Step S103, the control unit 38 transmits a light source stop instruction a3 to the light source controller 41 to stop the light emitting operation of the light source unit 60.

In Step S303, the light source controller 41 determines whether the light source controller 41 has received the light source stop instruction a3 from the control unit 38. When determining that the light source controller 41 has not received the light source stop instruction a3 (S303, N), the light source controller 41 returns to the process in Step S301, whereas when determining that the light source controller 41 has received the light source stop instruction a3 (S303, Y), the light source controller proceeds to a process in Step S304. In Step S304, the light source controller 41 stops the light emitting operation of the light source 60.

Thus, in this embodiment, since the abnormality detection is made based on the illuminance values of light emitted at each of the two segment periods that are time divided in the frame by use of the single threshold $V_{ref}$, the abnormality of the light source unit 60 can be detected with the simple configuration.

Second Embodiment

Figure 6:
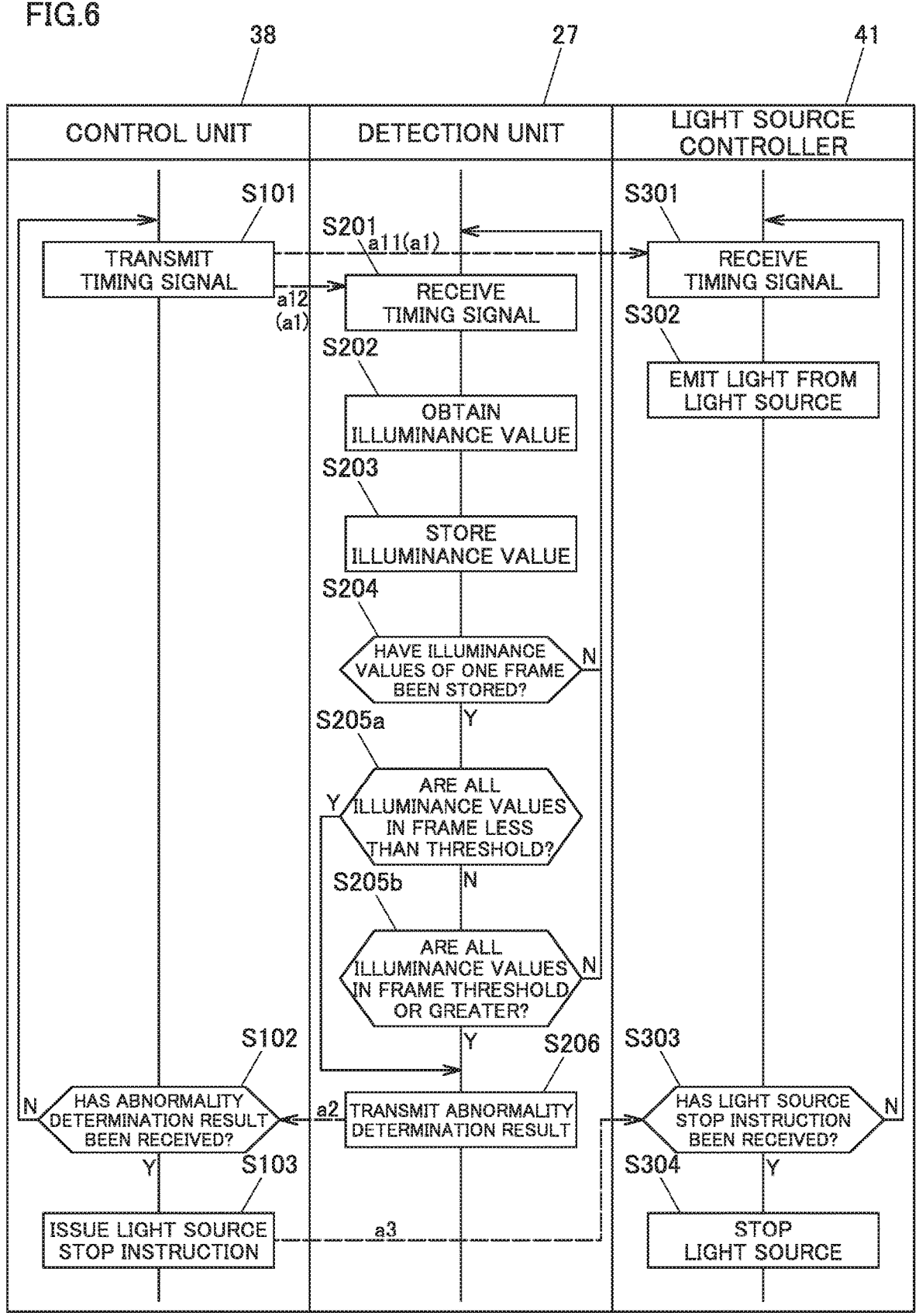
FIG. 6 is a flow chart illustrating a sequence of a projector according to a second embodiment of the invention.

Next, a second embodiment will be described. FIG. 6 is a flow chart illustrating a sequence of a projector 10 according to a second embodiment. In this embodiment, Step S205a and Step 205b are performed in place of Step S205 performed by the detection unit 27 illustrated in FIG. 4. Like reference numerals will be given to like configurations to those shown in FIG. 4, and the description thereof will be omitted or simplified here.

In Step S205a, a detection unit 27 determines whether all illuminance values $V_1$, $V_2$, $V_3$ of a frame are less than a threshold $V_{ref}$. When determining that all the illuminance values $V_1$, $V_2$, $V_3$ of the frame are not less than the threshold $V_{ref}$ (Step S205a, N), the detection unit 27 proceeds to a process in Step 205b, whereas when determining that all the illuminance values $V_1$, $V_2$, $V_3$ of the frame are less than the threshold $V_{ref}$ (Step S205a, Y), the detection unit 27 proceeds to a process in Step S206.

In Step S205b, the detection unit 27 determines whether all the illuminance values $V_1$, $V_2$, $V_3$ of the frame are the threshold value $V_{ref}$ or greater. When determining that all the illuminance values $V_1$, $V_2$, $V_3$ of the frame are not the threshold value $V_{ref}$ or greater (S205b, N), the detection unit 27 returns to the process in Step S201, whereas determining that all the illuminance values $V_1$, $V_2$, $V_3$ of the frame are the threshold value $V_{ref}$ or greater (S205b, Y), the detection unit 27 proceeds to the process in Step S206.

In the example of the illuminance values $V_1$, $V_2$, $V_3$ of the frame $F_1$ illustrated in FIG. 5, since all the illuminance values $V_1$, $V_2$, $V_3$ of the frame $F_1$ are not less than the threshold $V_{ref}$ (S205a, N) and all the illuminance values $V_1$, $V_2$, $V_3$ of the frame $F_1$ are not the threshold value $V_{ref}$ or greater (S205b, N), the detection unit 27 determines that the light source unit 60 is not abnormal and returns to the process in Step S201.

Modified Example of Second Embodiment

Figure 7:
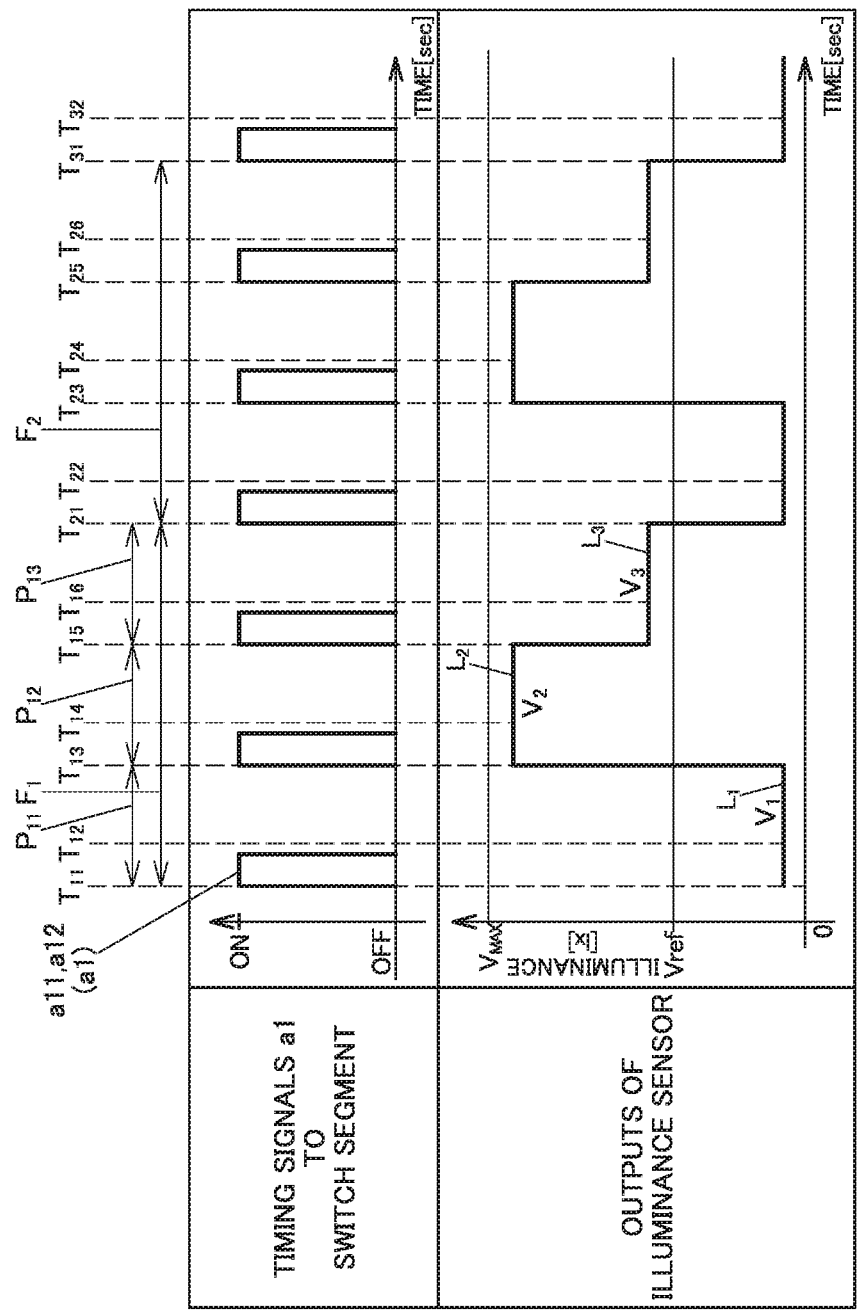
FIG. 7 is a time chart of timing signals of the projector according to the second embodiment of the invention and outputs of an illuminance sensor.

Next, a modified example of the second embodiment will be described. FIG. 7 is a time chart of a timing signal a1 of a projector 10 and outputs of an illuminance sensor 90 according to a modified example of the second embodiment. Timings $T_{12}$, $T_{14}$, $T_{16}$ at which illuminance values $V_1$, $V_2$, $V_3$ are obtained from the illuminance sensor 90 are determined based on a timing signal a1 as with the first embodiment.

In Step S205b in FIG. 6, a detection unit 27 may determine whether all the illuminance values within the frame are maximum values (Max values) $V_{Max}$ of outputs of the illuminance sensor 90. In this case, when determining that all the illuminance values within the frame are not their maximum values $V_{Max}$ (S205b, N), the detection unit 27 returns to the process in Step S201, whereas when determining that all the illuminance values within the frame are their maximum values $V_{Max}$ (S205b, Y), the detection unit 27 proceeds to the process in Step S206.

In relation to the illuminance values $V_1$, $V_2$, $V_3$ in this embodiment, in light in the red wavelength range $L_1$, light in the green wavelength range $L_2$ and the light in the blue wavelength range $L_3$, light in the green wavelength range $L_2$ shows a greatest value in the illuminance values $V_1$, $V_2$, $V_3$. Then, the output of the illuminance sensor 90 is regulated in advance so as to be substantially equal to the maximum value $V_{Max}$ of the illuminance value $V_2$ outputted by the illuminance sensor 90 when emitting light in the green wavelength range $L_2$ or smaller than the maximum value $V_{Max}$. In FIG. 7, the illuminance value $V_2$ of light in the green wavelength range $L_2$ is set lower than the maximum value $V_{Max}$. Then, since the illuminance values of light in the red wavelength range $L_1$, light in the green wavelength range $L_2$ and the light in the blue wavelength range $L_3$ are all lower than their maximum values $V_{Max}$ (Step 205b, N), the detection unit 27 determines that the light source unit 60 is not abnormal and returns to the process in Step S201.

Thus, in this embodiment, even in the case where the illuminance value of the illuminance sensor 90 is greater than the threshold $V_{ref}$ or is the maximum value $V_{Max}$ at all times, the detection unit 27 determines that the light source unit 60 is abnormal. When an output terminal of the illuminance sensor 90 is short circuited, the illuminance values $V_1$, $V_2$, $V_3$ may be increased higher than the threshold $V_{ref}$, and only with the determination in Step S205 in the first embodiment, the detection unit 27 determines that the light source unit 60 is not abnormal. However, in this embodiment, the abnormality can be detected properly by the process in Step S205b, whereby the result of the determination can be prevented from being deceived. In this way, the abnormality of the light source unit 60 can be detected with the simple configuration.

Third Embodiment

Figure 8:
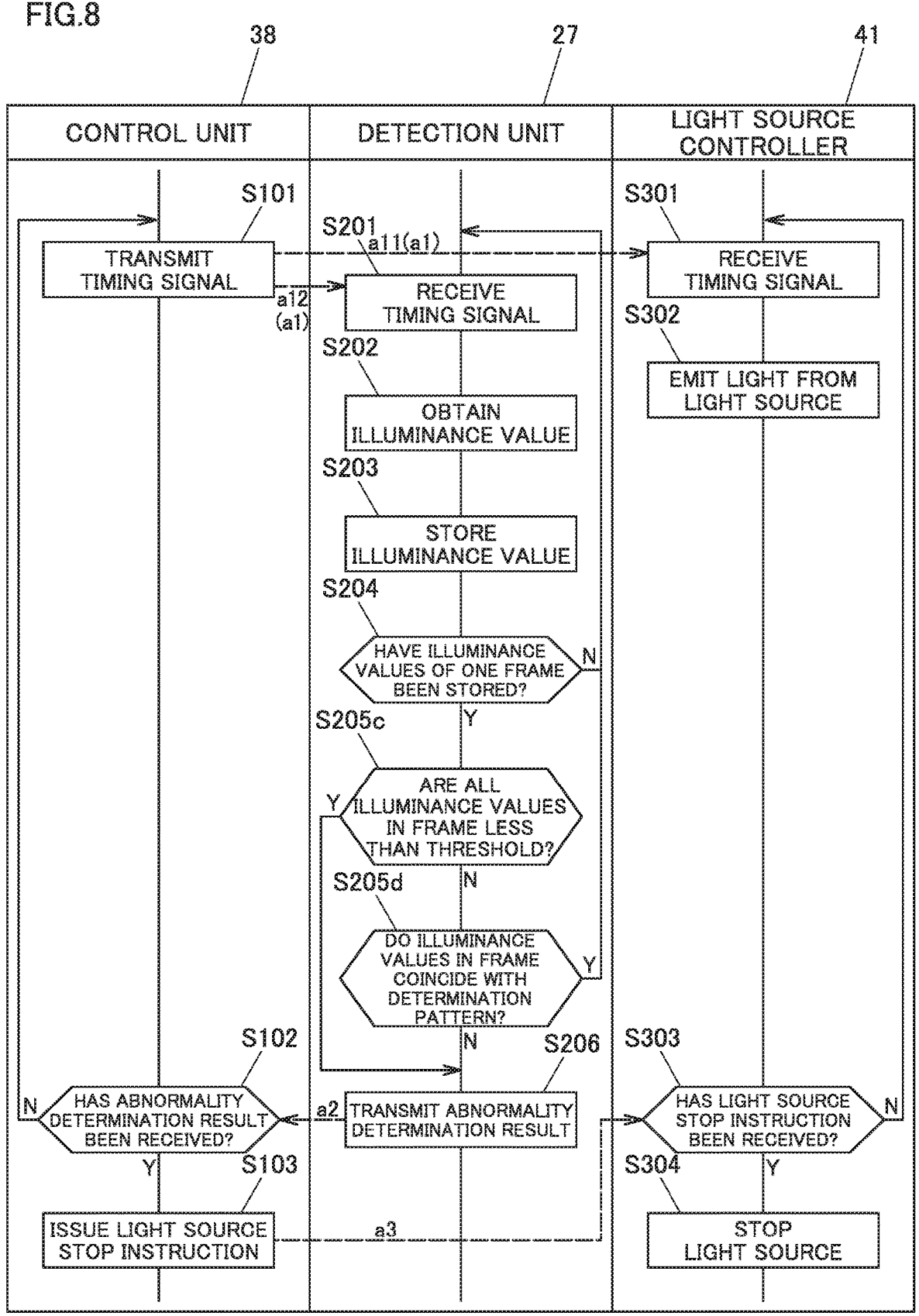
FIG. 8 is a flow chart illustrating a sequence of a projector according to a third embodiment of the invention.

Next, a third embodiment will be described. FIG. 8 is a flow chart illustrating a sequence of a projector 10 of this embodiment. In this embodiment, processes of Step S205c and Step 205d are performed in place of the process of Step S205 shown in FIG. 4. In the description of this embodiment, like reference numerals will be given to like configurations to those of the first embodiment, so that the description thereof will be omitted or simplified. Additionally, a time chart of timing signals a1 of the projector 10 and outputs of an illuminance sensor 90 is similar to the time chart illustrated in FIG. 5 in relation to the first embodiment.

In Step 205c, a detection unit 27 determines whether all illuminance values within one frame are less than the threshold $V_{ref}$ illustrated in FIG. 5. When determining that all the illuminance values are less than the threshold (S205c, Y), the detection unit 27 proceeds to a process in Step S206, whereas when determining that all the illuminance values are not less than the threshold (S205c, N), the detection unit 27 proceeds to a process in Step S205d.

In Step S205d, the detection unit 27 compares a magnitude pattern of illuminance values of light emitted within the frame with a determination pattern stored in advance in a memory unit 32 and determines whether the two patterns coincide with each other. When determining that the two patterns coincide with each other (Step 205d, Y), the detection unit 27 returns to a process in Step 201, whereas when determining that the two patterns do not coincide with each other (Step 205d, N), the detection unit 27 proceeds to the process in Step S206.

In this embodiment, as illustrated in FIG. 5, an abnormality determination is executed by making use of the fact that light in the red wavelength range $L_1$, light in the green wavelength range $L_2$ and light in the blue wavelength range $L_3$ have different illuminance values $V_1$, $V_2$, and $V_3$. The magnitudes of the illuminance values $V_1$, $V_2$, $V_3$ repeat a circulation of small→great→medium within one frame $F_1$ in the order of light in the red wavelength range $L_1$, light in the green wavelength range $L_2$ and light in the blue wavelength range $L_3$. Consequently, this repeat pattern is stored in the memory unit 32 in advance as a determination pattern for the abnormality determination performed in Step S205d, so that the determination pattern is compared with the illuminance values $V_1$, $V_2$, $V_3$ obtained in Step S202 for execution of an abnormality determination.

For example, the determination pattern of small→great→medium of the illuminance values $V_1$, $V_2$, $V_3$ is stored in advance in the memory unit 32. Since all the illuminance values $V_1$, $V_2 r$, $V_3$ are not less than the threshold $V_{ref}$ (S205c, N) in FIG. 5 and the pattern of the illuminance values $V_1$, $V_2 r$, $V_3$ coincides with the determination pattern (S205d, Y), the detection unit 27 determines that the light source unit 60 is not abnormal and returns to the process in Step S201.

The determination in Step S205d based on the patterns may be combined with the process in Step 205b of the second embodiment before or after the process in Step S205b for execution.

In the first to third embodiments, depending upon the modes and specifications of the projector 10, the light source unit 60 may be such that light in four or more different wavelength ranges is emitted for each of four or more segment periods which are time divided within one frame. For example, when the frame is time divided into four segment periods, the light source unit 60 can emit light in the red wavelength range, light in the green wavelength range, light in the blue wavelength range and light in the yellow wavelength range as light source light. Additionally, when the frame is time divided into six segment periods, the light source unit 60 can emit light in the red wavelength range, light in the green wavelength range, light in the blue wavelength range, light in the cyan wavelength range, light in the magenta wavelength range, and light in the yellow wavelength range as light source light.

Additionally, the abnormality determination can be executed based only on the illuminance value $V_2$ of light in the green wavelength range whose illuminance value is the greatest in the illuminance values. In Step S205, a configuration can be adopted in which when determining that the illuminance value $V_1$ is not less than the predetermined threshold $V_{ref}$, the detection unit 27 proceeds to the process in Step S201, whereas determining that the illuminance value $V_1$ is less than the threshold $V_{ref}$, the detection unit 27 proceeds to the process in Step S206.

When considering a detection of only the laser light sources (the blue laser diodes 71) which constitutes the light sources of light in the blue wavelength range and light in the green wavelength range, due to the limitation on the structure, even in the case where the illumination sensor 90 can be set only in a position where the illumination sensor 90 receives light in the red wavelength range, the illuminance sensor 90 can be configured so that light in the red wavelength range is not incident thereon by adding a member such as a tape configured to shield the illuminance sensor 90 from light in the red wavelength range. By adopting this configuration, even though light in the red wavelength range cannot be cut off perfectly, the processes in the first to third embodiments can be executed by controlling the threshold $V_{ref}$ or using the pattern comparison.

The light source can be prevented from being stopped while it is working normally due to an erroneous determination by setting a predetermined threshold for each projecting time in consideration of the deterioration with age of the light source unit 60, whereby the convenience in using the projector can be maintained. For example, the threshold can be a value that can change with time so as to decrease gradually.

In relation to the place where to set the illuminance sensor 90, as illustrated in FIG. 3, the illuminance sensor 90 is provided on the optical path of light in the red wavelength range, light in the green wavelength range and light in the blue wavelength range; however, the illuminance sensor 90 may be set in a place where light in the red wavelength range is not incident. By doing so, an abnormal state can be identified in which light from the light source (for example, light in the blue wavelength range emitted from the blue laser diodes 71 or light in the green wavelength range excited by the light in the blue wavelength range in the embodiments) which constitutes a great risk to the projector 10 is shone to the outside of the projector 10. The abnormality detection methods described in the embodiments can also be applied to this case.

Thus, the projector 10 that has been described heretofore includes an illuminance value obtaining unit configured to obtain an illuminance value of light emitted from a light source device configured to emit light for each of segment periods that are time divided within a frame and a detection unit configured to detect that the light source device is abnormal when all illuminance values obtained at the segment periods within the frame are less than a threshold.

Consequently, the improper use of the light source unit 60 can be prevented which involves a removal of the illuminance sensor 90 for modification of an output terminal thereof or removal of the light source unit 60 triggered by the removal of the illuminance sensor 90, which are possible to occur with conventional light source units. Additionally, the number of man hours involved in adjusting the gain of the illuminance sensor 90 can be reduced greatly. Light from all the light sources does not have to be shone onto the illuminance sensor 90, the limitation on the mounting of the illuminance sensor 90 can be mitigated.

A time period where the illuminance is the threshold $V_{ref}$ or greater and a time period where the illuminance is less than the threshold $V_{ref}$ are produced intentionally within a frame by separating light that is shone onto the illuminance sensor 90 and light that is not shone onto the illuminance sensor 90 in advance, whereby abnormality in relation to the removal or positional deviation of an optical member within the light source unit 60 can be detected accurately.

The detection unit 27 does not have to detect which color of light is actually illuminated, and there is a degree of freedom in selecting a place where to set the illuminance sensor 90, whereby the illuminance sensor 90 can also be set in a place where light in the red wavelength range is not received. Even in the configuration where the illuminance sensor 90 is disposed in the position where light in the red wavelength range is not received, or in the configuration where the setting of the threshold is changed by adding such member as a tape configured to cut off light in the red wavelength range immediately before the illuminance sensor 90, the determination algorithm described in each of the embodiments can be used interchangeably without depending upon the arrangement of the illuminance sensor 90.

Consequently, the light source unit 60 can be stopped when something abnormal occurs in the light source unit 60 or the projector 10, whereby the safety of the projector 10 can be improved.

With the abnormality detection unit where the detection unit determines that the light source device is abnormal when all the illuminance values are the threshold $V_{ref}$ or greater, the abnormality of the light source unit 60 can be detected by the determination process with a small load.

With the abnormality detection unit where the detection unit detects that the light source device is abnormal when all the illuminance values are greater than the threshold $V_{ref}$ and the maximum value $V_{Max}$ of the output of the illuminance value obtaining unit, since it is difficult to deceive the output value of the illuminance sensor 90 using a method that is not in synchronism with the timing signal a1, the abnormality detection can easily be executed.

With the abnormality detection unit where the detection unit determines that the light source device is abnormal when a plurality of illumination value patterns do not coincide with a predetermined determination pattern, it is difficult to deceive the illuminance value by modifying the output terminal of the illuminance sensor 90.

With the abnormality detection unit that deteriorates with time in such a way that the threshold decreases gradually, the light source can be prevented from being stopped by an erroneous determination while it is working properly, whereby the convenience of the projector can be maintained.

With the abnormality detection unit where the operation of the light source device is stopped when the detection units determines that the light source device is abnormal, the safety of the light source unit 60 can be ensured.

With the abnormality detection unit where the illuminance value obtaining unit is disposed in the position where light emitted for all the segment periods included in the frame can be received, or the illuminance value obtaining unit is disposed in the position where light whose illuminance value is the lowest in the illuminance values of light emitted for all the segment periods included in the frame when the light source device is normal is not received, the degree of freedom in designing the abnormality detection unit can be increased to a higher level.

With the abnormality detection unit where the illuminance value obtaining unit is disposed in the position where light in the red wavelength range $L_1$ whose illuminance value $V_1$ is the lowest in the illuminance values of light emitted for all the segment periods included in the frame when the light source device is normal is not received, the degree of freedom in designing the light source unit 60 can be increased to a higher level.

With the abnormality detection unit where the light source device includes the red light source device 120, the green light source device 80 and the blue light source device and the detection unit obtains the illuminance values $V_1$, $V_2$, $V_3$ of light in the red wavelength range, light in the green wavelength range and light in the blue wavelength range at the tree segment periods that are time divided in the frame, an abnormality determination and an abnormality detection can be executed while enabling the display of a color image.

In the abnormality detection method of the light source unit 60, the light source unit 60 includes a light emitting unit configured to emit light for each of segment periods $P_{11}$, $P_{12}$, $P_{13}$ that are time divided in a frame and a detection unit configured to detect that the light source unit 60 is abnormal when illuminance values $V_1$, $V_2$, $V_3$ of light emitted by the light emitting unit are obtained by an illumination sensor 90 and all the illuminance values at the segment periods are less than a threshold $V_{ref}$. In addition, in a program that is executed by the abnormality detection unit, a detection unit 27 executes a function of an illumination value obtaining unit configured to obtain an illuminance value of light emitted for each of segment periods that are time divided within a frame by a light source device and a function of a detection unit configured to detect that the light source device is abnormal when all the illuminance values obtained at the segment periods within the frame are less than a threshold.

Due to this, the light source unit 60 can be stopped with the simple configuration when an abnormality is generated in the light source unit 60 or the projector 10, whereby the safety of the light source unit 60 and hence the projector 10 can be improved.

While the embodiments of the invention have been described heretofore, the embodiments are presented as examples, and hence, there is no intention to limit the scope of the invention by the embodiments. These novel embodiments can be carried out in other various forms, and various omissions, replacements and modifications can be made to the embodiments without departing from the spirit and scope of the invention. Those resulting embodiments and their modifications are included in the spirit and scope of the invention and are also included in the scope of inventions claimed for patent under claims below and their equivalents.

What is claimed is:

1. An abnormality detection unit comprising:
   a processor;
   a light source device that emits light, one frame period being time divided into segment periods so that the light source emits light of a wavelength range in each segment period with the wavelength range of the emitted light being different in each of the segment periods; and
   an illuminance sensor for detecting an illuminance value of light emitted from the light source device,
   wherein the processor obtains an illuminance value detected by the illuminance sensor from the illuminance sensor during each of the segment periods, and the processor determines that the light source device is in an abnormal state, i) when each of the illuminance values obtained during each of the segment periods in the one frame period are less than a threshold value which is set to a common value during each of the segment periods, or ii) when each of the illuminance values obtained during each of the segment periods in the one frame period is equal to or greater than the threshold value,
   on the other hand, the processor determines that the light source device is in a normal state when any one or more of the illuminance values obtained during each of the segment periods in the one frame period are less than the threshold value and any one or more of the illuminance values are greater than the threshold value, and
   the processor determines the abnormal state as a state in which an optical member of the light source unit is in positional deviation or the optical member is removed.

2. The abnormality detection unit according to claim 1, wherein the threshold value is set to a maximum value of outputs of the illuminance sensor.

3. The abnormality detection unit according to claim 1, wherein the processor causes the threshold value to decrease with time.

4. The abnormality detection unit according to claim 1, wherein the processor stops the light source device from operating when the processor determines that the light source device is abnormal.

5. The abnormality detection unit according to claim 1, wherein the light source device comprises a red light source device configured to emit light in a red wavelength range, a green light source device configured to emit light in a green wavelength range, and a blue light source device configured to emit light in a blue wavelength range.

6. The abnormality detection unit according to claim 1, wherein the light source device comprises a red light source device configured to emit light in a red wavelength range, a blue light source device configured to emit light in a blue wavelength range as a laser beam, and a green light source device configured to emit light in a green wavelength range as luminescent light excited by the laser beam.

7. The abnormality detection unit according to claim 1, wherein the processor transmits a timing signal, and
wherein the light source device emits light having different wavelength ranges in a time dividing fashion based on the timing signal.

8. A projector comprising:
the abnormality detection unit according to claim 1;
a display device onto which light source light is shone from the abnormality detection unit to thereby form image light; and
a projection-side optical system configured to project the image light emitted from the display device onto a screen,
wherein the processor controls the display device and the abnormality detection unit.

9. An abnormality detection method executed by an abnormality detection unit comprising:
a light source device that emits light, one frame period being time divided into segment periods so that the light source emits light of a wavelength range in each segment period with the wavelength range of the emitted light being different in each of the segment periods; and
an illuminance sensor for detecting an illuminance value of light emitted from the light source device,
the abnormality detection method comprising:
an obtaining step of obtaining an illuminance value detected by the illuminance sensor from the illuminance sensor during each of the segment periods; and
a determining step of determining that the light source device is in an abnormal state, i) when each of the illuminance values obtained during each of the segment periods in the one frame period are less than a threshold value which is set to a common value during each of the segment periods, or ii) when each of the illuminance values obtained during each of the segment periods in the one frame period is equal to or greater than the threshold value,
on the other hand, a determining step of determining that the light source device is in a normal state when any one or more of the illuminance values obtained during each of the segment periods in the one frame period are less than the threshold value and any one or more of the illuminance values are greater than the threshold value,
wherein the determining step determines the abnormal state as a state in which an optical member of the light source unit is in positional deviation or the optical member is removed.

10. A recording medium recording in it a program executable by an abnormality detection unit comprising:
a light source device that emits light, one frame period being time divided into segment periods so that the light source emits light of a wavelength range in each segment period with the wavelength range of the emitted light being different in each of the segment periods; and
an illuminance sensor for detecting an illuminance value of light emitted from the light source device, and readable by a computer, the program being configured to realize:
an illuminance value obtaining function of obtaining an illuminance value detected by the illuminance sensor from the illuminance sensor during each of the segment periods; and
a determining function of determining that the light source device is in an abnormal state, i) when each of the illuminance values obtained during each of the segment periods in the one frame period are less than a threshold value which is set to a common value during each of the segment periods, or ii) when each of the illuminance values obtained during each of the segment periods in the one frame period is equal to or greater than the threshold value,
on the other hand, a determining function of determining that the light source device is in a normal state when any one or more of the illuminance values obtained during each of the segment periods in the one frame period are less than the threshold value and any one or more of the illuminance values are greater than the threshold value,
wherein the determining function determines the abnormal state as a state in which an optical member of the light source unit is in positional deviation or the optical member is removed.

* * * * *